(12) United States Patent
Tang

(10) Patent No.: US 11,863,049 B1
(45) Date of Patent: Jan. 2, 2024

(54) HOLLOW DIRECT-CURRENT BRUSHLESS MOTOR AND FAN

(71) Applicant: Dongliang Tang, Pingxiang (CN)

(72) Inventor: Dongliang Tang, Pingxiang (CN)

( * ) Notice: Subject to any disclaimer, the term of this patent is extended or adjusted under 35 U.S.C. 154(b) by 0 days.

(21) Appl. No.: 18/364,079

(22) Filed: Aug. 2, 2023

(51) Int. Cl.
| | |
|---|---|
| H02K 7/14 | (2006.01) |
| H02K 7/08 | (2006.01) |
| H02K 7/00 | (2006.01) |
| H02K 1/17 | (2006.01) |
| F04D 29/62 | (2006.01) |
| F04D 29/34 | (2006.01) |

(52) U.S. Cl.
CPC ............. *H02K 7/14* (2013.01); *F04D 29/34* (2013.01); *F04D 29/626* (2013.01); *H02K 1/17* (2013.01); *H02K 7/003* (2013.01); *H02K 7/085* (2013.01)

(58) Field of Classification Search
CPC ............ H02K 7/14; H02K 1/17; H02K 7/003; H02K 7/085; F04D 17/06; F04D 25/062; F04D 19/002; F04D 29/059; F04D 29/083; F04D 29/626; F04D 25/0633; F04D 29/329; F04D 29/34
See application file for complete search history.

(56) References Cited

U.S. PATENT DOCUMENTS

| | | | | |
|---|---|---|---|---|
| 2009/0155081 A1* | 6/2009 | Yu | ........................ | F04D 25/0613 416/219 R |
| 2011/0103957 A1* | 5/2011 | Tang | ...................... | F04D 29/36 416/204 R |
| 2021/0348616 A1* | 11/2021 | Hwang | ................. | F04D 29/626 |

FOREIGN PATENT DOCUMENTS

| | | | | |
|---|---|---|---|---|
| CN | 207363947 U | * | 5/2018 | |
| CN | 208174508 U | * | 11/2018 | |
| CN | 208589837 U | * | 3/2019 | |
| CN | 213478745 U | * | 6/2021 | |
| CN | 214945131 U | * | 11/2021 | |
| CN | 215256967 U | * | 12/2021 | |
| CN | 215444525 U | * | 1/2022 | |
| CN | 218416155 U | * | 1/2023 | |

* cited by examiner

*Primary Examiner* — Dominick L Plakkoottam
(74) *Attorney, Agent, or Firm* — Daniel M. Cohn; Howard M. Cohn

(57) ABSTRACT

A hollow brushless motor and a fan include a center shaft, a rotating housing, a stator, a driver, and a permanent magnet. The center shaft is of a hollow structure. A wire passing channel allowing power lines to penetrate through is defined in the center shaft. A through hole communicated with the wire passing channel is defined on one side of the center shaft. An accommodating cavity is formed in the rotating housing. The stator is fixed on the center shaft and is disposed in the accommodating cavity. The driver is electrically connected to the stator. The driver is disposed beside the through hole. The permanent magnet is fixed to an inner side wall of the accommodating cavity and is disposed on an outer periphery of the stator. The fan includes the motor and fan blades.

14 Claims, 4 Drawing Sheets

HOLLOW DIRECT-CURRENT BRUSHLESS MOTOR AND FAN

TECHNICAL FIELD

The present disclosure relates to a field of motor fans, and in particular to a hollow direct-current brushless motor having a permanent magnet disposed on an outer side of a stator and a fan.

BACKGROUND

At present, fan motors on the market are basically direct-current brushless motors having a permanent magnet disposed on an outer rotor. The direct-current brushless motors generally comprise an oil bearing made by powder metallurgy. A defect of the oil bearing is that the oil bearing is not subjected to force, so the oil bearing is serious worn when oil gets less and less and after long-time use, resulting in shaking and imbalance of the fan motors. In severe cases, the fan motors stop working and have a shorter overall service life.

Secondly, due to a fact that the fan motors adopt the oil bearing made by powder metallurgy, fan blades typically have a center shaft to match with the oil bearing component for use. The fan blades must be at the outermost end of the fan motors, so an appearance and a style of the fan blades are relatively fixed. When installing a fan with a lamp, the lamp can only be disposed on a periphery or a rear surface of the fan blades, the lamp cannot be installed at a front end of the fan blades, which has limitations for adapting to new product designs.

Moreover, some hollow direct-current brushless motors having a permanent magnet disposed on an outer rotor on the market are generally large in power and heavy in volume. The fan blades are fixed to a housing thereof through screws, which cannot meet requirements for miniaturization, portability, and small scene use.

In addition, the fan blades of conventional fans are generally snapped on convex circular buttons of the conventional fans, which can rotate normally when a rotating speed, of a fan motor thereof is small. However, the fan blades are easily fallen off when the rotating speed of the fan motor thereof is very large.

Therefore, it is necessary to provide a scheme to solve above problems.

SUMMARY

In view of shortcomings in the prior art, the present disclosure mainly aims to provide a hollow direct-current brushless motor having a permanent magnet disposed on an outer side of a stator and a fan, which effectively solve a problem of short service life of conventional fan motors.

In order to achieve above purpose, following technical schemes are adopted:

The hollow direct-current brushless motor includes a center shaft, a rotating housing, a stator, a driver, and a permanent magnet. The center shaft is of a hollow structure. A wire passing channel allowing power lines to pass through is defined in the center shaft. A through hole communicated with the wire passing channel is defined on one side of the center shaft. The rotating housing is rotatably sleeved on an outer side of the center shaft. An accommodating cavity is formed in the rotating housing. The stator is fixed on the center shaft and is disposed in the accommodating cavity. The driver is fixed to the stator and is disposed in the accommodating cavity. The driver is electrically connected to the stator. The driver is disposed beside the through hole. The permanent magnet is fixed to an inner side wall of the accommodating cavity and is disposed on an outer periphery of the stator.

Optionally, the rotating housing is rotatably disposed on the center shaft through bearings.

Optionally, each of the bearings is a ball bearing,

Optionally, the rotating housing includes a housing and a rear cover. The rear cover is fixed to a rear side of the housing. The housing and the rear cover are enclosed to form the accommodating cavity.

Optionally, fixing grooves are respectively defined in an inner side of a middle of the housing and an inner side of a middle of the rear cover. The bearings are one-to-one fixed in the fixing grooves.

Optionally, a fixing column is disposed in the housing. A fixing hole is defined in the fixing column. A penetrating hole is defined on the rear cover. The penetrating hole directly faces the fixing hole. A fixing screw passes through the penetrating hole to fixedly connect to the fixing hole.

Optionally, two ends of the center shaft respectively extend out of a front side of the housing and a rear side of the rear cover.

Optionally, the center shaft is cylindrical. The wire passing channel passes through two end surfaces of the center shaft.

Optionally, two ends of the center shaft are respectively connected to a fixing component and a lamp component.

Optionally, the rotating housing is cylindrical.

Optionally, the driver is in a disc shape. The driver is sleeved on the outer side of the center shaft.

Optionally, the permanent magnet is a circular sleeve. The permanent magnet is disposed in a sleeve. The sleeve is tightly matched and fixed with an inner wall of the accommodating cavity.

A fan includes the hollow permanent magnet external-rotation type direct-current brushless motor and a plurality of fan blades. The plurality of fan blades are disposed on the rotating housing and rotate along with the rotating housing.

Optionally, the plurality of fan blades are disposed on an outer wall surface of the rotating housing and are evenly distributed at intervals on periphery.

Optionally, the number of the plurality of fan blades is 3+N.

Optionally, the plurality of fan blades and the rotating housing are integrally formed and connected.

Optionally, the plurality of fan blades are fixedly clamped with the rotating housing.

Optionally, positioning embedding grooves are defined on an outer wall of the rotating housing. A snapping groove is concavely defined on a bottom surface of each of the positioning embedding grooves. Each of the plurality of fan blades comprises a base plate and a blade. The base plate and the blade of each of the plurality of fan blades are integrally formed and connected. Each base plate is matched with a corresponding positioning embedding groove and is embedded in the corresponding positioning embedding groove for positioning. An elastic snapping portion is disposed on and protruded from each base plate. Each elastic snapping portion is fixedly snapped on a corresponding snapping groove.

Optionally, each of the positioning embedding grooves is arc-shaped; and each base plate is arc-shaped.

Optionally, each snapping groove is located in a center position of a corresponding positioning embedding groove. Each elastic snapping portion is located in a center position of a corresponding base plate.

Compared with prior art, in the present disclosure, a conventional oil bearing made by powder metallurgy is replaced with the ball bearings, which effectively prolongs service life of the hollow direct-current brushless motor and the fan. A conventional motor housing is removed and the fan blades and the rotating housing are directly integrated, the fan blades may be assembled and disassembled without screws, which saves installation steps and improves production efficiency. The central shaft is hollow, which facilitates wiring, so that the fan blades are disposed in a middle of the fan, which makes it easy to design different styles of fan with a lamp. Moreover, a connection method between the fan blades and the rotating housing is improved, and no screw is used, which solves a problem that the conventional fan blades snapping on a fan by convex circular buttons are easily fallen off when a rotating speed of a fan motor thereof is very large

Figure 1:
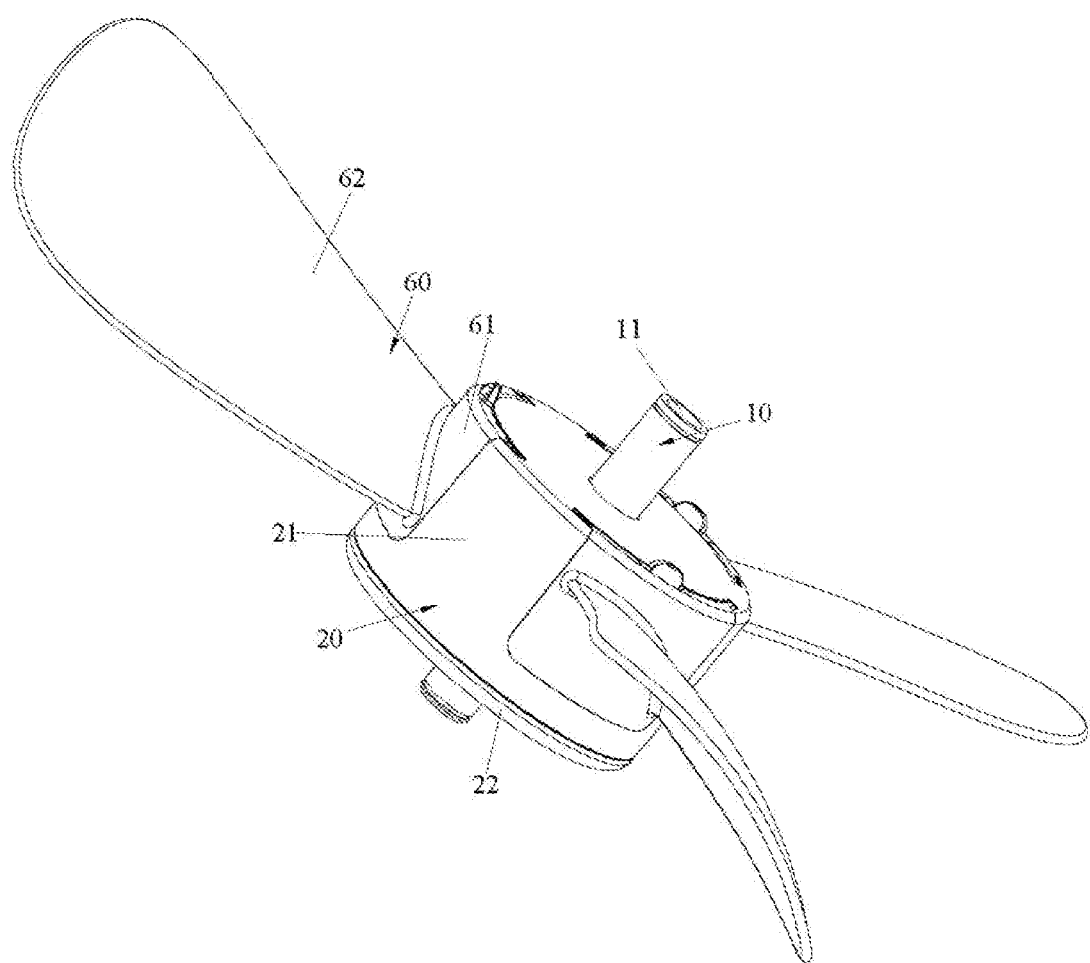
FIG. 1 is a perspective schematic diagram of a fan according to one optional embodiment of the present disclosure.

Reference number in the drawings: 10. center shaft; 11. wire passing channel; 12. through hole; 20. rotating housing; 21. housing; 211. fixing column; 22. rear cover; 221. penetrating hole; 201. accommodating cavity; 202. fixing grooves; 203. positioning embedding groove; 204. snapping groove; 30. stator; 40. driver; 50. permanent magnet; 51. sleeve; 60. fan blades; 61, base plate; 62. blade; 601. elastic snapping portion; 70. bearing.

DETAILED DESCRIPTION

Figure 2:
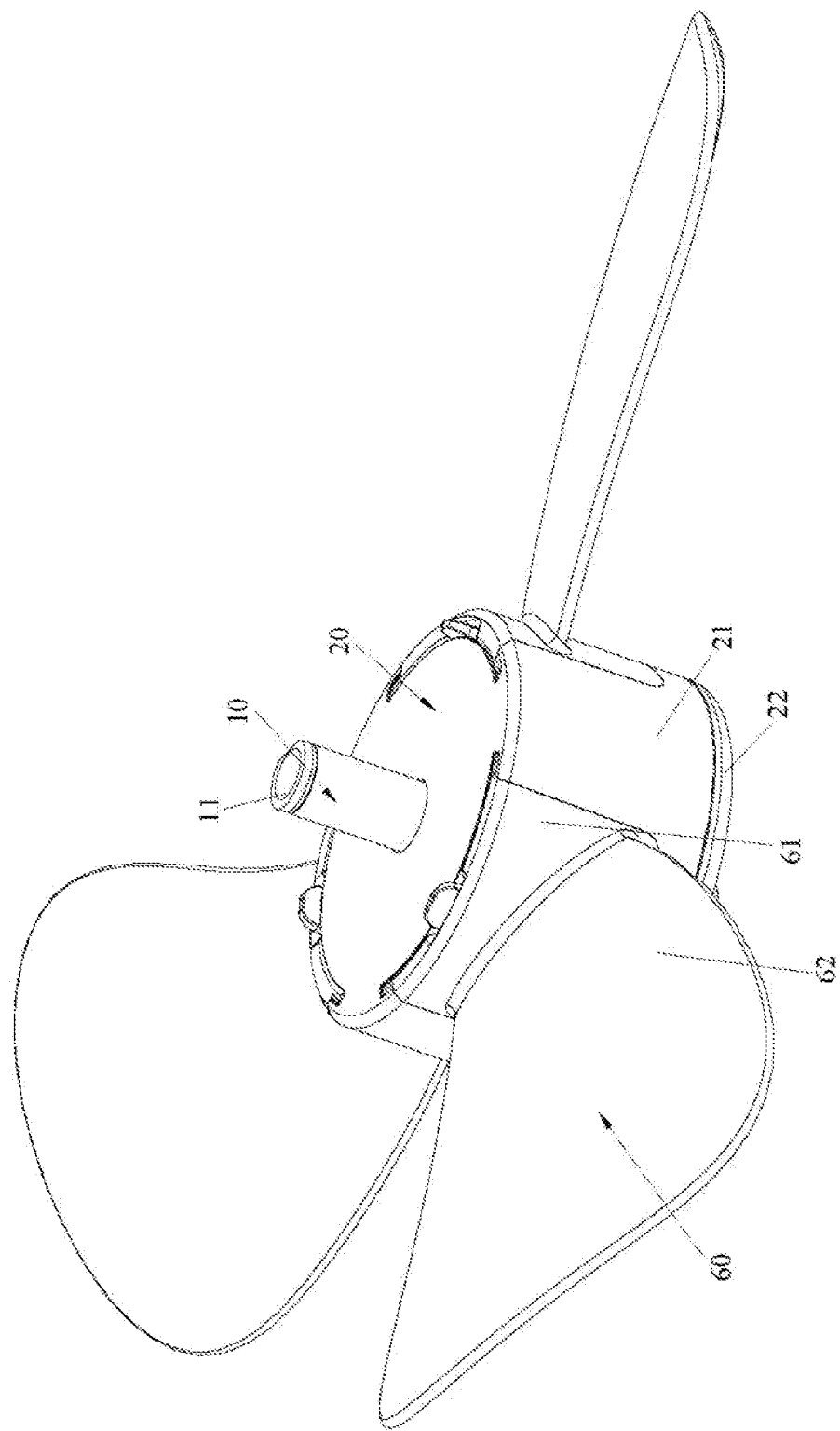
FIG. 2 is another perspective schematic diagram of the fan according to one optional embodiment of the present disclosure.
Figure 3:
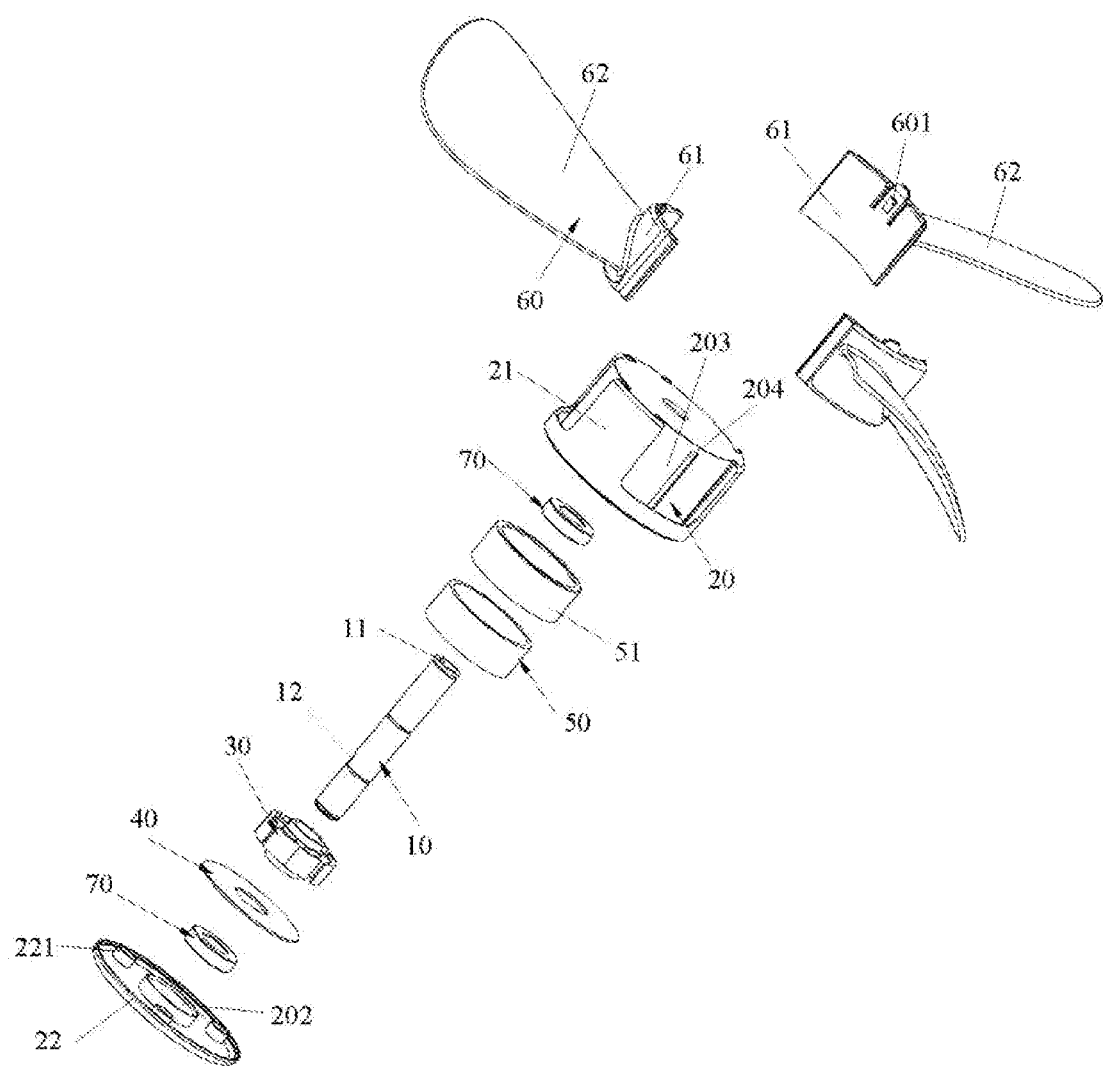
FIG. 3 is an exploded schematic diagram of the fan according to one optional embodiment of the present disclosure.
Figure 4:
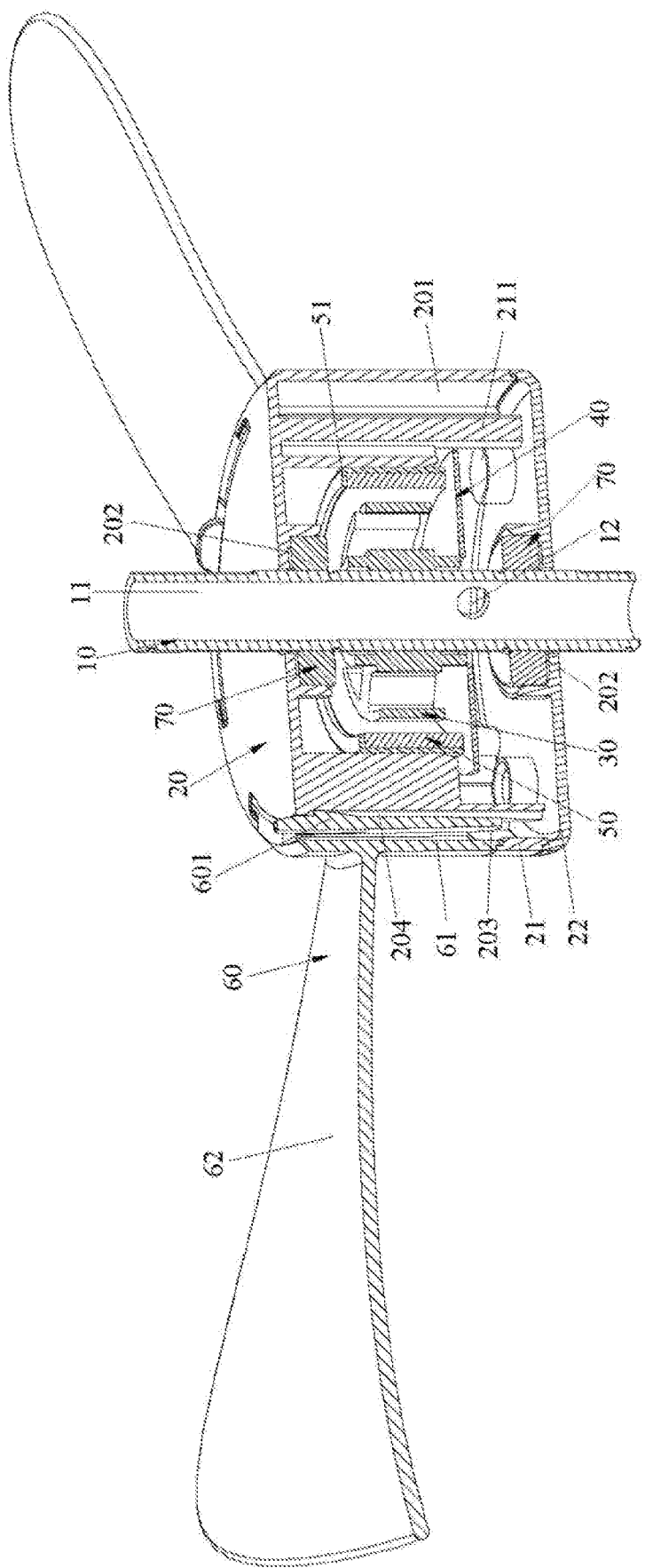
FIG. 4 is a cross-sectional schematic diagram of the fan according to one optional embodiment of the present disclosure.

Referring to FIGS. 1-4, a specific structure of a fan is shown in one optional embodiment of the present disclosure. The fan includes a center shaft 10, a rotating housing 20, a stator 30, a driver 40, a permanent magnet 50, and a plurality of fan blades 60.

The center shaft 10 is of a hollow structure. A wire passing channel 11 allowing power lines to pass through is defined in the center shaft 10, A through hole 12 communicated with the wire passing channel 11 is defined on one side of the center shaft 10. In the embodiment, the center shaft 10 is cylindrical. The wire passing channel 11 passes through two end surfaces of the center shaft 10. Two ends of the center shaft 10 are respectively connected to a fixing component and a lamp component, where the fixing component and the lamp component are not shown in the drawings.

The rotating housing 20 is rotatably sleeved on an outer side of the center shaft 10. An accommodating cavity 201 is formed in the rotating housing 20. In the embodiment, the rotating housing 20 is rotatably disposed on the center shaft 10 through bearings 70. Each of the bearings 70 is a ball bearing. Specifically, the rotating housing 20 includes a housing 21 and a rear cover 22, The rear cover 22 is fixed to a rear side of the housing 21. The housing 21 and the rear cover 22 are enclosed to form the accommodating cavity 201. Fixing grooves 202 are respectively defined in an inner side of a middle of the housing 21 and an inner side of a middle of the rear cover 22. The bearings 70 are one-to-one fixed in the fixing grooves 202. A fixing column 211 is disposed in the housing 21. A fixing hole is defined in the fixing column 211, where the fixing hole is not shown in the drawings. A penetrating hole 221 is defined on the rear cover 22, The penetrating hole 221 directly faces the fixing hole. A fixing screw passes through the penetrating hole 221 to connect to the fixing hole. Two ends of the center shaft 10 respectively extend out of a front side of the housing 21 and a rear side of the rear cover 22. In addition, the rotating housing 20 is cylindrical.

The stator 30 is fixed on the center shaft 10 and is disposed in the accommodating cavity 201.

The driver 40 is fixed to the stator 30 and is disposed in the accommodating cavity 201. The driver 40 is electrically connected to the stator 30. The driver 40 is disposed beside the through hole 12. In the embodiment, the driver 40 is in a disc shape. The driver 40 is sleeved on the outer side of the center shaft 10.

The permanent magnet 50 is fixed to an inner side wall of the accommodating cavity 201 and is disposed on an outer periphery of the stator 30. In the embodiment, the permanent magnet 50 is a circular sleeve. The permanent magnet is disposed in a sleeve 51. The sleeve 51 is tightly matched and fixed with an inner wall of the accommodating cavity 201.

The plurality of fan blades 60 are disposed on the rotating housing 20 and rotate along with the rotating housing 20. In the embodiment, the plurality of fan blades 60 are disposed on an outer wall surface of the rotating housing 20 and are evenly distributed at intervals. The number of the plurality of fan blades 60 is 3+N, which is not limited thereto. The plurality of fan blades 60 and the rotating housing 20 are integrally formed and connected. Of course, the plurality of fan blades 60 are fixedly clamped with the rotating housing 20. When the plurality of fan blades 60 are fixedly clamped with the rotating housing 20, the specific structures are as follows:

Positioning embedding grooves 203 are defined on an outer wall of the rotating housing 20. A snapping groove 204 is concavely defined on a bottom surface of each of the positioning embedding grooves 203. Each of the plurality of fan blades 60 comprises a base plate 61 and a blade 62. The base plate 61 and the blade 62 of each of the plurality of fan blades 60 are integrally formed and connected. Each base plate 61 is matched with a corresponding positioning embedding groove 203 and is embedded in the corresponding positioning embedding groove 203 for positioning. An elastic snapping portion 601 is disposed on and protruded from each base plate 61. Each elastic snapping portion 601 is fixedly snapped on a corresponding snapping groove 204. Each of the positioning embedding grooves 203 is arc-shaped; and each base plate 61 is arc-shaped. Each snapping groove 204 is located in a center position of a corresponding positioning embedding groove 203. Each elastic snapping portion 601 is located in a center position of a corresponding base plate 61.

During assembly, each base plate 61 is inserted into the corresponding positioning embedding groove 203, and after each base plate 61 is inserted in place, each elastic snapping portion 601 is fixedly snapped on the corresponding snapping groove 204, which achieves screw-free disassembly and assembly of the plurality of fan blades 60. The structure of the fan is simple and production assembly is convenient.

A working principle of the embodiment of the present disclosure is as follows:

During working, the center shaft 10 is connected to the fixing component to play a fixing role. A section of the lamp component fixed to the center shaft 10 is a fixed component for fixing. The center shaft 10 does not rotate to do work, and after the stator 30 is powered on to do work. The permanent magnet 50 drives the rotating housing 20 to rotate on the center shaft 10. During rotation, the bearings 70 plays a role in separating the center shall 10 and the rotating housing 20, ensuring normal operation of the hollow direct-current brushless motor. The plurality of fan blades 60 rotate along with the rotating housing 20, thereby achieving a fan function.

A design focus of the present disclosure is that: compared with prior art, a conventional oil bearing made by powder metallurgy is replaced with the ball bearings, which effectively prolongs service life of the hollow direct-current brushless motor and the fan. A conventional motor housing is removed and the fan blades and the rotating housing are directly integrated, the fan blades may be assembled and disassembled without screws, which saves installation steps and improves production efficiency. The central shaft is hollow, which facilitates wiring, so that the fan blades are disposed in a middle of the fan, which makes it easy to design different styles of fan with a lamp. Moreover, a connection method between the fan blades and the rotating housing is improved, and no screw is used, which solves a problem that the conventional fan blades snapping on a fan by convex circular buttons are easily fallen off when a rotating speed of a fan motor thereof is very large The technical principle of the present disclosure is described above in combination with specific embodiments. These descriptions are merely intended to explain the principle of the present disclosure and cannot be interpreted in any way as a limitation to a scope of protection of the present disclosure. Based on the explanation herein, a person skilled in the art would have been able to associate other specific embodiments of the present disclosure without involving an inventive effort, all of which fall within the scope of protection of the present disclosure.

What is claimed is:

1. A fan, comprising:
    a hollow direct-current brushless motor and
    a plurality of fan blades;
    wherein the plurality of fan blades are disposed on a rotating housing and rotate along with the rotating housing;
    wherein the hollow direct-current brushless motor comprises a center shaft, the rotating housing, a stator, a driver, and a permanent magnet;
    wherein the center shaft is of a hollow structure, a wire passing channel allowing power lines to pass through is defined in the center shaft, a through hole communicated with the wire passing channel is defined on one side of the center shaft; the rotating housing is rotatably sleeved on an outer side of the center shaft, an accommodating cavity is formed in the rotating housing; the stator is fixed on the center shaft and is disposed in the accommodating cavity; the driver is fixed to the stator and is disposed in the accommodating cavity, the driver is disposed beside the through hole; and the permanent magnet is fixed to an inner side wall of the accommodating cavity and is disposed on an outer periphery of the stator;
    the plurality of fan blades are fixedly clamped with the rotating housing;
    wherein positioning embedding grooves are defined on an outer wall of the rotating housing; a snapping groove is concavely defined on a bottom surface of each of the positioning embedding grooves; each of the plurality of fan blades comprises a base plate and a blade, the base plate and the blade of each of the plurality of fan blades are integrally formed and connected; each base plate is matched with a corresponding positioning embedding groove and is embedded in the corresponding positioning embedding groove for positioning; an elastic snapping portion is disposed on and protruded from each base plate; each elastic snapping portion is fixedly snapped on a corresponding snapping groove.

2. The fan according to claim 1, wherein the plurality of fan blades are disposed on an outer wall surface of the rotating housing and are evenly distributed at intervals on the rotating housing.

3. The fan according to claim 2, wherein the number of the plurality of fan blades is 3+N.

4. The fan according to claim 1, wherein each of the positioning embedding grooves is arc-shaped; and each base plate is arc-shaped.

5. The fan according to claim 1, wherein each snapping groove is located in a center position of a corresponding positioning embedding groove; and each elastic snapping portion is located in a center position of a corresponding base plate.

6. The fan according to claim 1, wherein the rotating housing is rotatably disposed on the center shaft through bearings.

7. The fan according to claim 6, wherein each of the bearings is a ball bearing.

8. The fan according to claim 6, wherein the rotating housing comprises a housing and a rear cover, and the rear cover is fixed to a rear side of the housing; the housing and the rear cover are enclosed to form the accommodating cavity.

9. The fan according to claim 8, wherein fixing grooves are respectively defined in an inner side of a middle of the housing and an inner side of a middle of the rear cover; and the bearings are one-to-one fixed in the fixing grooves.

10. The fan according to claim 8, wherein two ends of the center shaft respectively extend out of a front side of the housing and a rear side of the rear cover.

11. The fan according to claim 1, wherein the center shaft is cylindrical, and the wire passing channel runs through two end surfaces of the center shaft.

12. The fan according to claim 1, wherein the rotating housing is cylindrical.

13. The fan according to claim 1, wherein the driver is in a disc shape, and the driver is sleeved on the outer side of the center shaft.

14. The fan according to claim 1, wherein the permanent magnet is a circular sleeve; the permanent magnet is disposed in a sleeve, and the sleeve is matched and fixed with an inner wall of the accommodating cavity.

\* \* \* \* \*